(12) United States Patent
Morikawa et al.

(10) Patent No.: US 8,160,810 B2
(45) Date of Patent: Apr. 17, 2012

(54) ROUTE SEARCH SYSTEM, ROUTE SEARCH TERMINAL AND ROUTE SEARCH METHOD

(75) Inventors: Takayuki Morikawa, Nagoya (JP); Toshiyuki Yamamoto, Nagoya (JP); Tomio Miwa, Nagoya (JP); Akinori Satou, Minato-ku (JP); Enjian Yao, Minato-ku (JP); Yasuhiro Sugisaki, Koto-ku (JP)

(73) Assignee: NEC Soft, Ltd., Tokyo (JP)

( * ) Notice: Subject to any disclaimer, the term of this patent is extended or adjusted under 35 U.S.C. 154(b) by 623 days.

(21) Appl. No.: 12/341,397

(22) Filed: Dec. 22, 2008

(65) Prior Publication Data

US 2009/0164114 A1 Jun. 25, 2009

(30) Foreign Application Priority Data

Dec. 25, 2007 (JP) .................................. 2007-332723

(51) Int. Cl.
*G01C 21/36* (2006.01)
(52) U.S. Cl. ...................................................... 701/209
(58) Field of Classification Search .................... 701/209
See application file for complete search history.

(56) References Cited

U.S. PATENT DOCUMENTS 7,421,334 B2 * 9/2008 Dahlgren et al. ............. 701/117
* cited by examiner

*Primary Examiner* — James Zurita
(74) *Attorney, Agent, or Firm* — Sughrue Mion, PLLC

(57) ABSTRACT

The route search system of the present invention receives the provision request of the information about route search from a route search terminal. The information included in the provision request from a route search terminal is acquired, calculation processing of the environmental load value of the relevant vehicle and the environmental load value of other vehicle by which it is generated with movement of a relevant vehicle from the acquired information is carried out using an environmental load calculation unit.

17 Claims, 7 Drawing Sheets

ROUTE SEARCH SYSTEM, ROUTE SEARCH TERMINAL AND ROUTE SEARCH METHOD

This application is based upon and claims the benefit of priority from Japanese Patent Application No. 2007-332723, filed on Dec. 25, 2007, the disclosure of which is incorporated herein in its entirety by reference.

BACKGROUND OF THE INVENTION

The present invention relates to a route search system, route search terminal, and route search method for searching an optimum route in view of environmental loads.

Recent route search systems are fabricated taking various factors in consideration. These factors include conventional ones such as a minimum distance or a minimum time of travel from a present location to a destination, and a degree of priority to expressways. In addition, environmental factors such as the roadside environment are also included in these factors.

A route search system or route search terminal designed in consideration of the environment calculates an effect given by a relevant vehicle to the environment based on traffic information collected in the past and traffic information collected in real-time to find a route in which the effect is minimal.

Such route search systems or devices designed in consideration of the environment are described for example in Japanese Laid-Open Patent Publication No. 2002-230685 (Patent Document 1) and No. 2005-030823 (Patent Document 2).

Patent Document 1 describes a roadside environment monitoring system and method capable of measuring the roadside environment possibly deteriorated by travel of vehicles by employing an ITS (Intelligent Transport System) to measure the roadside environment by means of various sensors and to detect traveling vehicles. The roadside environment monitoring system and method are also capable of preventing the environment from being worsened by imposing restrictions or charging when deterioration in the environment has exceeded a certain value.

Patent Document 2 describes a route search apparatus which searches a route from a starting point to a destination by calculating an amount of greenhouse gas discharged by a relevant vehicle during a travel from the starting point to the destination to find a route in which the discharged greenhouse gas amount is minimal. Patent Document 2 also describes a route search apparatus for searching a route by providing a relevant vehicle with a sensor to measure a greenhouse gas amount and finding a route in which a greenhouse gas amount possibly discharged by the vehicle is minimal on the basis of the actually measured greenhouse gas amount.

Traffic information systems are also generally known, which transmit traffic information such as travel time or traffic jam information for each road (link).

SUMMARY

However, these related art route search systems or apparatuses do not give sufficient consideration to the environment.

Specifically, for example, the roadside environment monitoring system described in Patent Document 1 takes into consideration only the roadside environment of roads provided with the roadside environment monitoring system. On the other hand, no consideration is given to adverse effects possibly given to detour roads or the like when vehicles are forced to travel (move) these roads due to enforcement of traffic control or the like. This means that the attempt to protect the roadside environment of some roads may lead to deterioration of roadside environment of other roads. Further, no consideration is given to environmental loads possibly newly generated by the detour traffic of vehicle.

The route search apparatus described in Patent Document 2 searches a route by calculating an amount of greenhouse gas possibly discharged by a relevant vehicle. Therefore, this technique takes into consideration only the greenhouse gas discharged by the relevant vehicle, whereas no consideration is given to effects given by the relevant vehicle to others (other vehicles). It cannot be said that the greenhouse gas discharge amount calculated by this technique is correct enough, since the travel time (running speed) on a road link is varied by the relevant vehicle traveling along the road link. Further, no consideration at all is given to the fact that, when the relevant vehicle travels along a road link, the greenhouse gas amount discharge by other vehicles traveling along the same road link is thereby increased. In other words, this related art technique underestimates the increase in environmental loads caused by the discharge of greenhouse gas by the travel of the relevant vehicle along the road link.

The present invention seeks to solve the above-mentioned problems.

It should be noted that, herein, an environmental load(s) amount caused by traffic congestion increased by addition of the relevant vehicle to a traffic stream is defined as a link cost(s) used in route search processing. Specific examples of the link cost may be an amount of increase in vehicle-hour in entire roads caused by addition of one vehicle (relevant vehicle), an amount of increase in greenhouse gas ($CO_2$) discharge in entire roads caused by addition of one vehicle (relevant vehicle). The term "vehicle-hour" as used herein is represented by a product of number of vehicles and traveling hours.

The present invention provides a route search system including: a route search terminal installed on an automobile or motorcycle for transmitting a provision request requesting for provision of information relating to route search for the automobile or motorcycle and receiving the information relating to route search provided in response to the provision request;an information provision subsystem for acquiring information contained in the provision request from the route search terminal; and an environmental load calculation unit for calculating, based on the information acquired by the information provision subsystem, an environmental load generated by move of the automobile or motorcycle having the route search terminal installed thereon, and an environmental load generated by other automobile and/or motorcycle.

The present invention provides a route search system which is capable of reducing the environmental loads and traffic congestion caused by a vehicle or the like to be route-guided joining a traffic stream.

DESCRIPTION OF THE EXEMPLARY EMBODIMENTS

An exemplary embodiment of the present invention will be described with reference to FIGS. 1 to 11.

Figure 1:
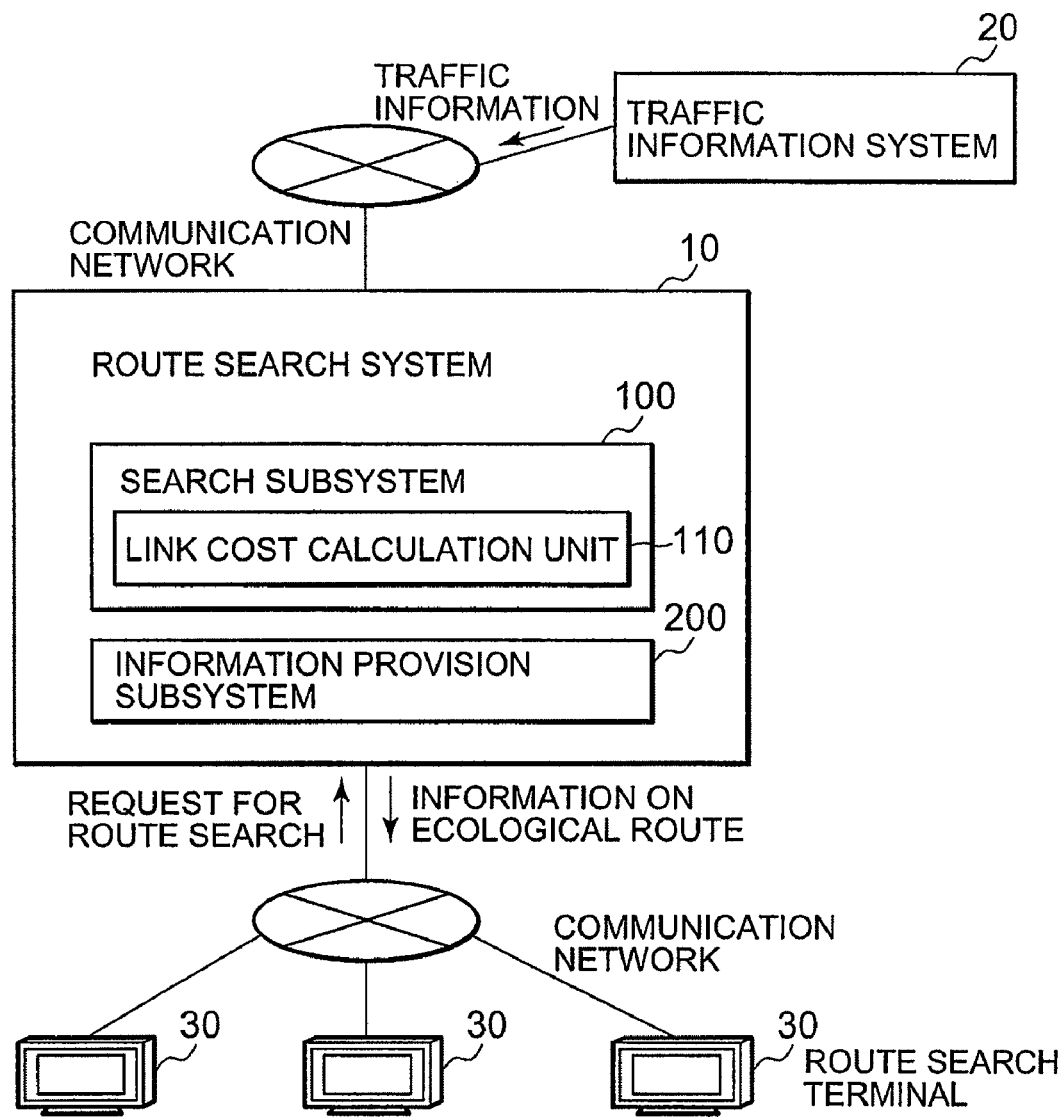
FIG. 1 is a schematic diagram showing an example of a route search system 10 according to an exemplary embodiment of the invention.

FIG. 1 is a schematic diagram showing an example of a route search system 10 according to an embodiment of the invention. The route search system 10 of this embodiment acquires real-time traffic information from a traffic information system 20 and operates in response to a route search request from the route search terminal 30.

For clarity of description, the following description of the route search system 10 will be made while dividing the same into two subsystems, a search subsystem 100 and an information provision subsystem 200.

The search subsystem 100 is a subsystem for performing processing to search an ecological route by acquiring various information such as real-time traffic information collected in real time, statistical traffic information collected in the past, and road network information on road conditions, and calculating link cost information and ecological route information with the use of a link cost calculation unit 110 as environmental load calculation unit or the like.

The real-time traffic information refers to latest traffic information for each link (each road) acquired by the traffic information system 20.

The statistical traffic information refers to traffic information obtained by statistically processing traffic information collected in the past on at every day and/or at every time for each link (each road).

The road network information refers to various information relating to links (roads). The road network information includes, for example, connection information of links (roads) at intersections, types of links (roads), and lengths of links (roads).

The link cost information is information on link costs (environmental loads) used in processing for searching for an ecological route.

The ecological route information refers to information on routes determined by taking environmental loads into consideration. The ecological route information include, for example, information on a route in which the amount of $CO_2$ discharge by the relevant vehicle is minimal, first ecological route information on a route in which the increase in vehicle-hours in entire roads caused by addition of one vehicle is minimal, and second ecological route information on a route in which the increase in $CO_2$ discharge amount in the entire roads caused by addition of one vehicle is minimal.

The ecological route search processing refers to processing for searching for a route using a Dijkstra method or the like, by calculating link costs based on input information. This processing will be described later in detail.

In response to an information provision request (request information) from the route search terminal 30, the information provision subsystem 200 acquires ecological route information output by the search subsystem 100 and map information (map data) recorded in a memory unit, and calculates ecological route map information which is map image information, and ecological route numerical information which is various numerical information indicating environmental loads.

The traffic information system 20 is a commonly-used traffic information system transmitting real-time traffic information. The traffic information system 20 may be, for example, a probe information system, VICS (registered trademark in Japan) or the like.

The route search terminal 30 may be a terminal of a car navigation system, or an information processing terminal such as a cellular phone, a PDA (Personal Digital Assistant), and a personal computer.

Figure 2:
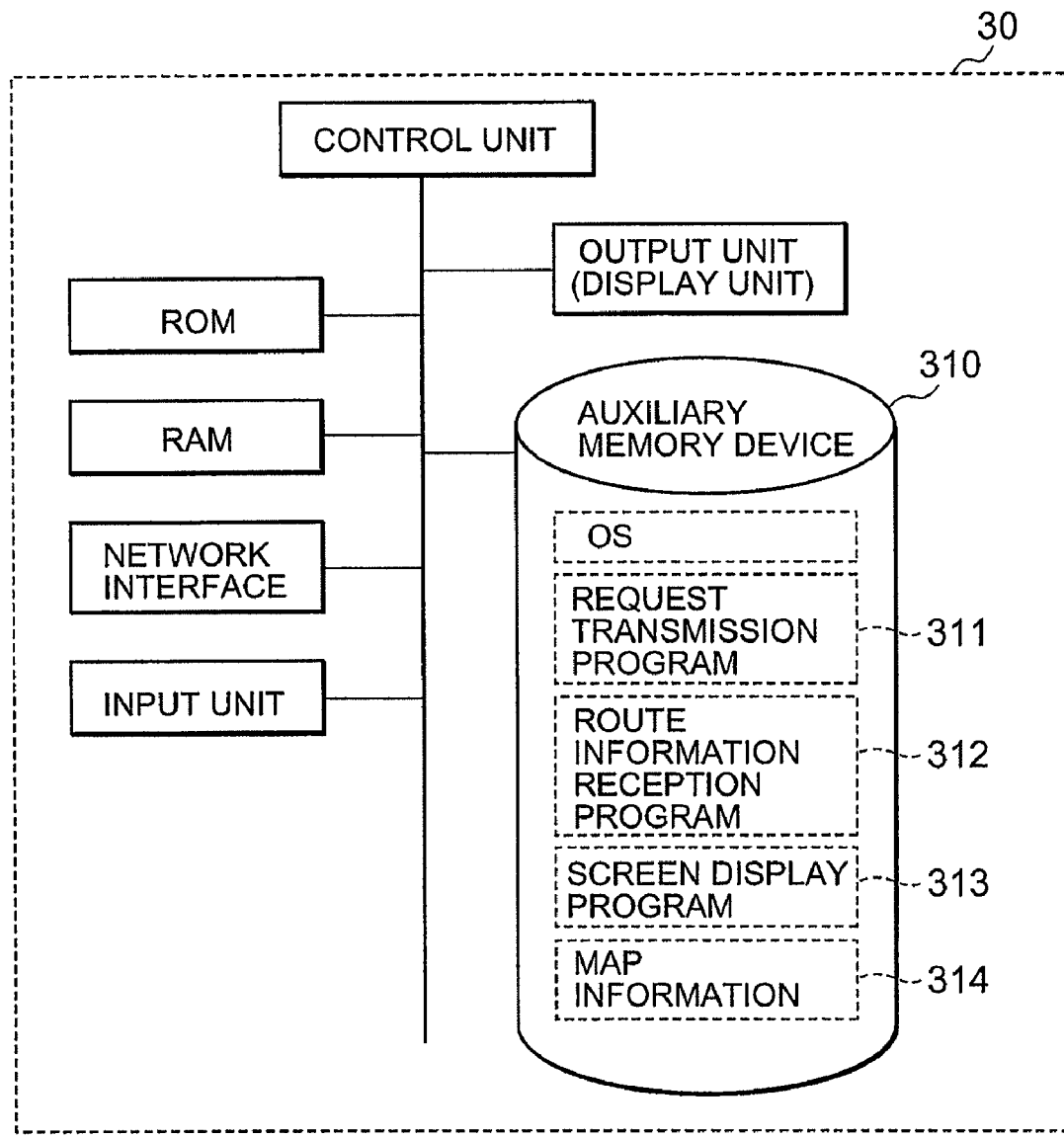
FIG. 2 is a block diagram showing a configuration example of a route search terminal 30.

FIG. 2 is a block diagram showing a configuration example of the route search terminal 30. The route search terminal 30 is a commonly-used information processing terminal having a configuration as shown in FIG. 2, for example.

The route search terminal 30 is composed of a control unit performing various arithmetic processing, a ROM (Read Only Memory) for storing a basic control program, a RAM (Random Access Memory) for temporarily storing information and recording an expanded program used for various operations, a network interface for communicating with the route search system 10 via a communication network, an input unit used for inputting information, an output unit for outputting information (including a display unit for displaying an electronic screen), and an auxiliary memory device 310 for recording various programs and information.

There are recorded, in the auxiliary memory device 310, an OS (Operating System) for operating the route search terminal 30 as a whole, a request transmission program 311 for requesting the route search system 10 to provide information relating to route search, a route information reception program 312 for receiving the information relating to route search, a screen display program 313 for displaying an electronic screen to the user, and electronic map information 314.

A storage area of the RAM may be used in place of the auxiliary memory device 310, or another recoding medium may be used.

Thus, the route search system 10 configured as described above according to the present embodiment is capable of reducing the environmental loads and traffic congestion caused by addition a vehicle provided with a route search terminal to be route-guided to a traffic stream.

A description will be made of operation of the route search system 10 according to the present embodiment.

Figure 3:
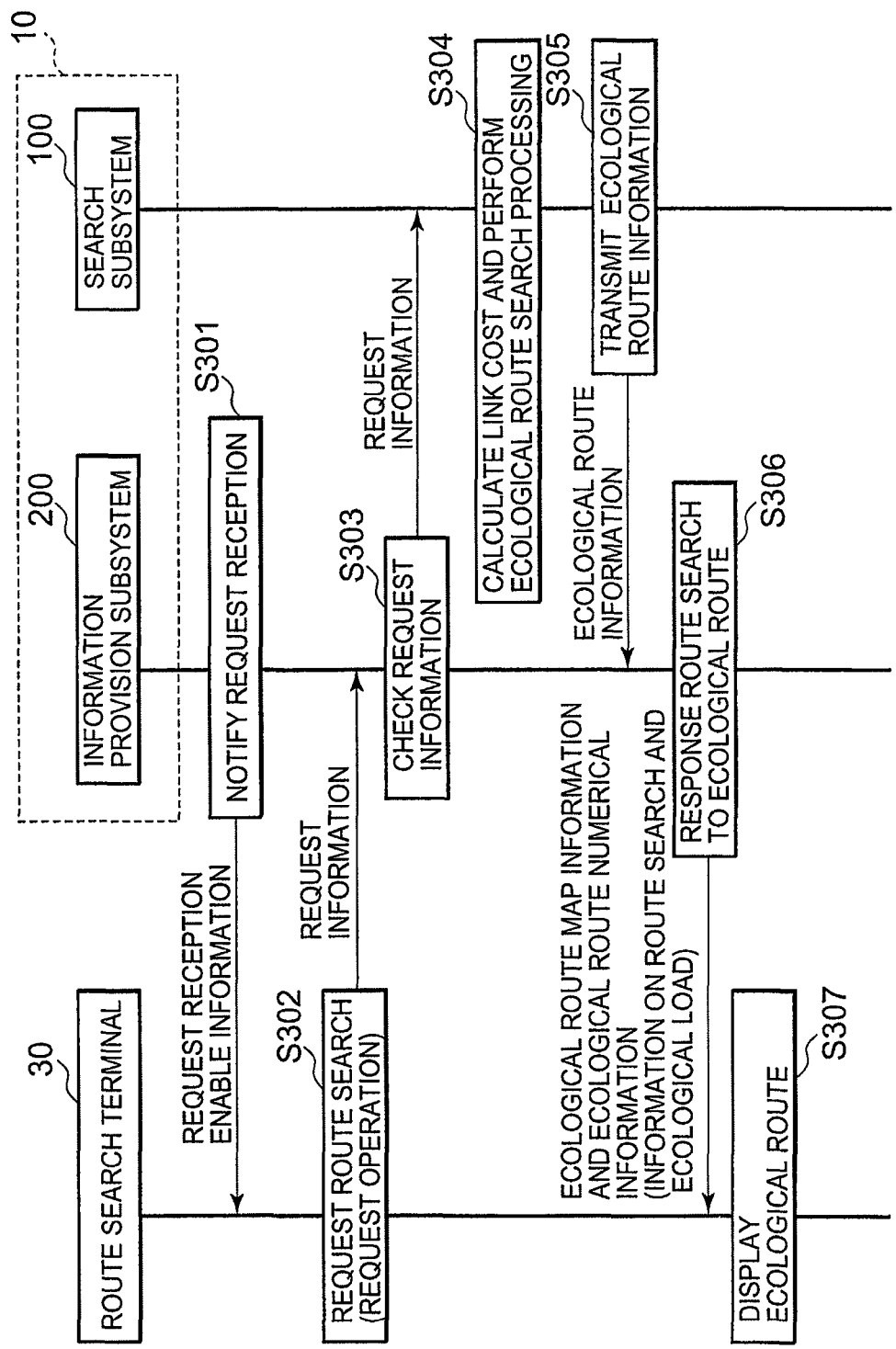
FIG. 3 is a sequence diagram showing a flow of processing by the route search system 10 and the route search terminal 30.

FIG. 3 is a sequence diagram showing a flow of processing performed by the route search system 10 and the route search terminal 30. The route search system 10 responds to an information provision request from the route search terminal 30 by using an environmental load calculation unit calculating environmental loads, a search subsystem searching for an ecological route in which the environmental loads are low, and an information provision subsystem transmitting information relating to a route search terminal to the route search terminal 30.

The information provision subsystem 200 of the route search system 10 notifies the route search terminal 30 of reception of a request for ecological route search processing (step S301). The notification of reception of the request may be provided, for example, by a screen prompting an input of a destination and present location, a notification of completed preparation for reception of a request, or information of a request information transmission format.

Acknowledging that a request is allowed, the route search terminal 30 transmits an ecological route search request (a request for information used for route search) as request information (step S302).

Receiving the request information, the information provision subsystem 200 performs processing to check for errors or the like, and transfers the request information to the search subsystem 100 (step S303).

Receiving the request information, the search subsystem 100 performs processing to calculating a link cost (environmental load value) based on this request information and real-time traffic information acquired from the traffic system 20, and processing to search for an ecological route and outputs ecological route information (step S304).

The search subsystem 100 transmits the ecological route information to the information provision subsystem 200 (step S305).

Receiving the ecological route information, the information provision subsystem 200 calculates ecological route map information and ecological route numerical information based on the ecological route information and transmits the ecological route map information and ecological route numerical information thus obtained to the route search terminal 30, as a response to the request from the route search terminal 30 (step 306).

Receiving the ecological route map information and ecological route numerical information, the route search terminal 30 notifies the operator of the information with the use of a display or the like provided in the route search terminal 30 (step S307). The operator thus recognizes an ecological route based on the notified information and travels along this route.

By the series of operations described above, the route search system 10 of the present embodiment is enabled to reduce the increase in environmental load and traffic congestion caused by addition of the vehicle provided with the route search terminal 30 to be route-guided to a traffic stream.

A description will be made of ecological route search processing performed by the search subsystem 100 with reference to FIGS. 4 and 5. The ecological route search processing can be divided into batch processing to be performed at certain intervals of time, and real-time processing to be performed when receiving a route search request from the route search terminal 30. For clarity of description, these two types of processing will be described separately. The batch processing may be performed together with the real-time processing when receiving a route search request if more efficiency is required for the information processing device.

Figure 4:
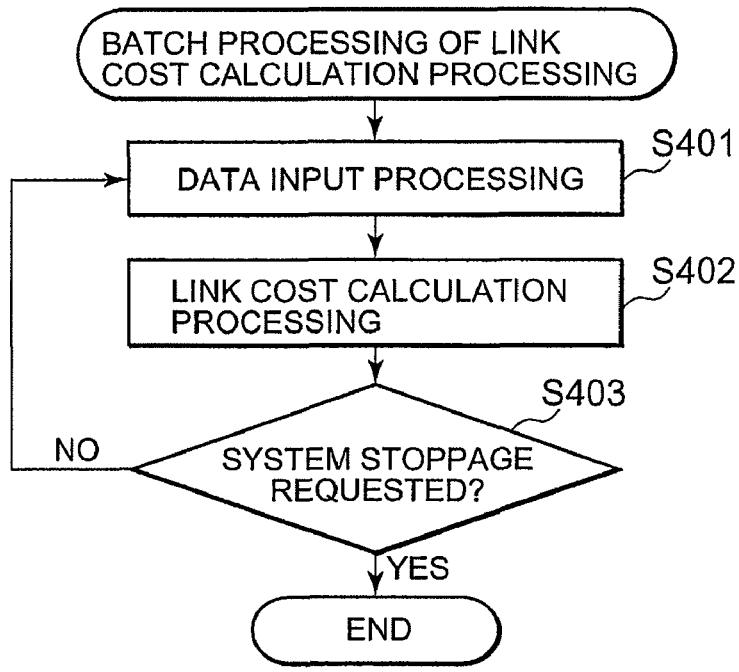
FIG. 4 is a flowchart showing batch processing performed by a search subsystem 100.

FIG. 4 is a flowchart showing batch processing performed by the search subsystem 100. The batch processing may be performed periodically in accordance with update of real-time traffic information acquired from the traffic information system 20.

The search subsystem 100 acquires real-time traffic information, statistical traffic information, and road network information from the traffic information system (step S401).

The search subsystem 100 calculates link cost information to obtain a link cost for each link (step S402). The processing to calculate the link cost will be described later in detail.

The search subsystem 100 determines whether stoppage of the system is requested or not. If not requested, the search subsystem 100 continues the batch processing, whereas if requested, the search subsystem 100 stops the system (step S403).

Figure 5:
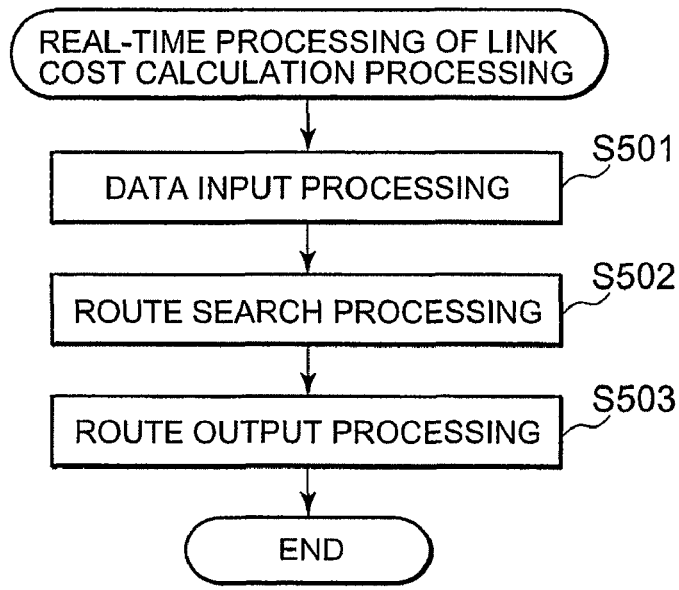
FIG. 5 is a flowchart showing real-time processing performed by the search subsystem 100.

FIG. 5 is a flowchart showing real-time processing performed by the search subsystem 100.

When receiving ecological route search request information (see step S303 in FIG. 3) from the information provision subsystem 200, the search subsystem 100 transmits ecological route information to the information provision subsystem 200 (see step S305 in FIG. 3). The request information contains a departure point to start the route search, a destination point, and time of departure. The request information may additionally contain information on a vehicle or the like on which the route search terminal 30 is installed.

The search subsystem 100 acquires the link cost information calculated in the batch processing, road network information, and request information (step S501).

Based on the various information acquired, the search subsystem 100 performs processing to search for a route in which the environmental load is low, by using its search processing unit (step S502). This route search processing will be described later in detail.

The search subsystem 100 transmits the ecological route information to the information provision subsystem 200 (step S503).

The ecological route information contains the self minimum $CO_2$ route information, the first ecological route information, and the second ecological route information, and these pieces of information are each composed of positional (topological) information on a route from a departure point to a destination point, and numerical information such as a travel time value, a $CO_2$ discharge amount, a first ecological cost value (increase in vehicle-hours in the entire roads caused by addition of one vehicle to the traffic), a second ecological cost value (increase in $CO_2$ discharge amount in the entire roads caused by addition of one vehicle to the traffic), a travel distance value, and so on.

Figure 6:
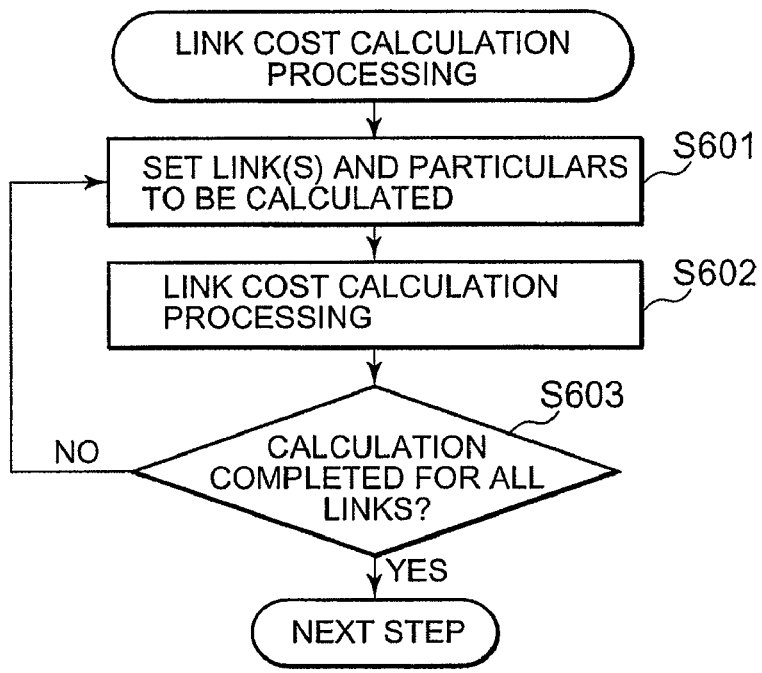
FIG. 6 is a flowchart showing link cost calculation processing performed by the search subsystem 100.

FIG. 6 is a flowchart showing link cost calculation processing performed by the search subsystem 100 to calculate link cost information for each link.

The search subsystem 100 sets links and particulars for which link costs are calculated (step S601).

The search subsystem 100 calculates link costs (environmental loads) according to a formula using the acquired real-time traffic information, statistical traffic information, and road network information, and adds up the link costs if necessary (step S602). Herein, the link cost information is composed for example of three types of links costs, namely self $CO_2$ (carbon dioxide) link cost information, first ecological route link cost information, and second ecological route link cost information. The link costs may be any other than those mentioned above.

The search subsystem 100 checks whether the calculation processing of the link costs has been performed for all the links and all the particulars, and repeats the processing until the calculation processing is completed for all the links and all the particulars (step S603).

Link costs for each link are shown in Tables 1 and 2 below. The link costs are obtained by performing arithmetic processing on various input information based on the formulae shown in Table 2.

TABLE 1

| Link Cost | Particulars |
|---|---|
| Self $CO_2$ link cost | $CO_2$ amount discharge by the relevant vehicle |
| First ecological route link cost | Increase in vehicle-hours in the entire roads caused by addition of one vehicle to the traffic |
| Second ecological route link cost | Increase in $CO_2$ discharge amount in the entire roads caused by addition of one vehicle to the traffic |

TABLE 2

| Link Cost | Calculation Formula |
| --- | --- |
| Self $CO_2$ link cost | $(EF_a) \cdot l_a = \left(\dfrac{2019}{v_a} - 2.087 \times v_a + 0.01865 \times v_a^2 + 156.05\right) \cdot l_a$ |
| First ecological route link cost | $= \{t_a(q_a + 1) \times (q_a + 1)\} - \{t_a(q_a) \times q_a\}$ |
| Second ecological route link cost | $= \{EF(v(q_a + 1)) \times (q_a + 1)\} \cdot l_a - \{EF(v(q_a)) \times q_a\} \cdot l_a$ |

It should be noted that the self $CO_2$ link cost (EF) indicates the relation between running speed v and $CO_2$ discharge amount EF of a gasoline automobile as obtained in Traffic Engineering, Morikita Shuppan Co., by S. Kawakami and H. Matsui (1987) (Non-Patent Document 1), and Fuel consumption rate and carbon discharge coefficient in a vehicle travel, Civil Engineering Journal, Vol. 43, No. 11, pp. 50-55: Nodoka OSHIRO, Masayuki MATSUSHITA, Ryoji NAMIKAWA, Hirofumi ONISHI (2001) (Non-Patent Document 2).

Meanings of the symbols indicated in Table 2 are shown below.

$v_a$: travel speed (km/h) at which the relevant vehicle is supposed to travel in a link a
$EF_a$: $CO_2$ discharge amount (g-$CO_2$/km) in the link a
$t_a$: travel time in the link a at a certain time of day (real-time traffic information or statistical traffic information)
$q_a$: traffic volume (vehicle-hours) in the link a at a certain time of day The variables $t_a$, $v_a$ and $q_a$ used in calculation of each link cost are defined as follows.

The variable $t_a$ is input real-time traffic information or statistical traffic information.

The variable $v_a$ is calculated by $v_a = l_a/t_a$ based on $t_a$ and a link length $l_a$ of the link a.

The variable $q_a$ is calculated by either one of the following two calculation methods.

A first calculation method employs a BPR function (1) to calculate a traffic volume, using a function indicated by the formula (1) below representing a relation between traffic volume and travel time used by the U.S. Bureau of Public Roads.

$$t_a(q_a) = t_{a0} \times \left\{1 + \alpha\left(\dfrac{q_a}{c_a}\right)^\beta\right\} \quad \text{Formula (1)}$$

The variables in the formula (1) are defined as follows.

$t_a$: travel time in an arbitrary link a (real-time traffic information or statistical traffic information)
$t_{a0}$: travel time when a vehicle travels at a free running speed in the arbitrary link a
$q_a$: traffic volume in the arbitrary link a
$\alpha$, $\beta$: parameter estimate
$c_a$: allowable traffic capacity in the arbitrary link a The variables $t_{a0}$, $\alpha$, $\beta$, and $c_a$ are determined by citing appropriate values derived from study results in the field of traffic engineering.

A second method employs a k-v formula to calculate a traffic volume, using a k-v curve representing a relation between traffic density k and vehicle running speed v in a certain link (formula (2)) and a basic formula (formula (3)) defined by variables of traffic volume q, average space velocity v, and traffic density k.

$$v_a = v_{af}\left(1 - \dfrac{k_a}{k_{aj}}\right) \quad \text{Formula (2)}$$

$$q_a = k_a \cdot v_a \quad \text{Formula (3)}$$

The variables in the formulae above are defined as follows.

$v_a$: speed (km/h) at which a relevant vehicle is supposed to travel in an arbitrary link a
$v_{af}$: speed (km/h) when running at a free running speed in the arbitrary link a
$k_{aj}$: saturated traffic density in the arbitrary link a
$k_a$: traffic density in the arbitrary link a The variables $v_{af}$ and $k_{aj}$ are determined by using appropriate values commonly used in traffic engineering.

Figure 7:
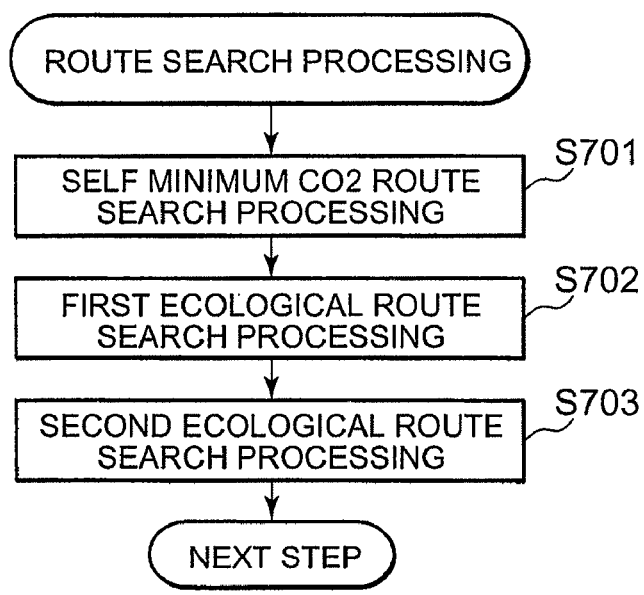
FIG. 7 is a flowchart showing route search processing performed by the search subsystem 100.

FIG. 7 is a flowchart showing route search processing performe by the search subsystem 100. The search subsystem 100 calculates ecological route information, using various collected information as well as the link cost information obtained by the link cost calculation processing. The following description with reference to FIG. 7 will be made, using the examples of the link costs mentioned above, namely self $CO_2$ link cost information, first ecological route link cost information, and second ecological route link cost information. A commonly used route search processing method such as a Dijkstra method and a label correction method may be used as a route search processing algorithm.

The search subsystem 100 performs processing to search for a self minimum $CO_2$ route based on the self $CO_2$ link cost information, and calculates self minimum $CO_2$ route information (step S701).

The search subsystem 100 performs processing to search for a first ecological route based on the first ecological route link cost information and calculates first ecological route information (step S702).

The search subsystem 100 performs processing to search for a second ecological route based on the second ecological route link cost information and calculates second ecological route information (step S703).

The route information is used to find a route good for the environment (ecological route) by adding up an environmental load generated by travel of the relevant vehicle, another environmental load generated by other vehicles affected by the relevant vehicle traveling in a set link, and still another environmental load generated by ambient environment generated by the relevant vehicle traveling in the set link. The route in which the added value is minimal (the total of environmental loads is minimal) is determined as the ecological route. The adding-up of the environmental loads may be performed by either real-time processing or batch processing.

Figure 8:
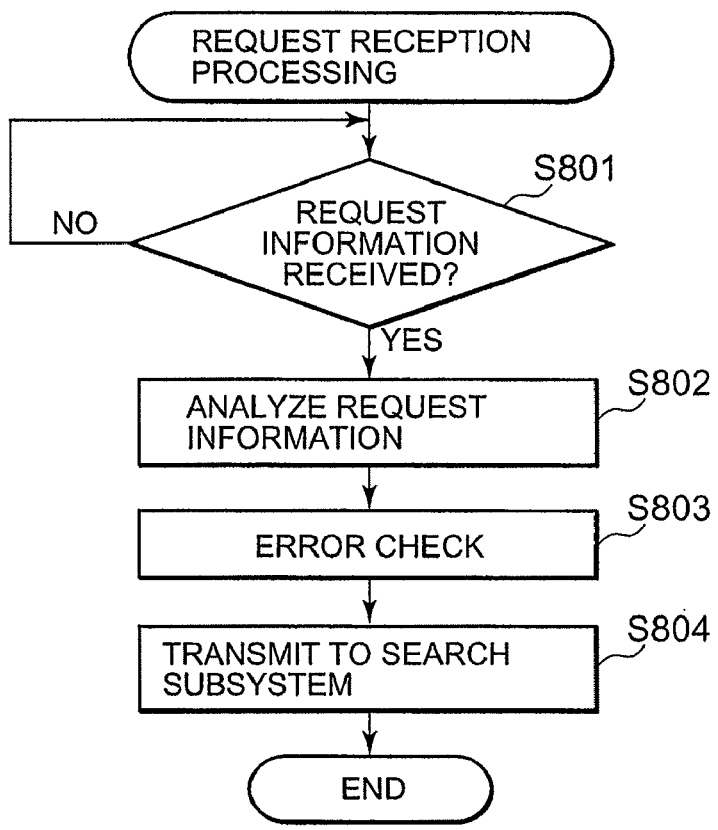
FIG. 8 is a flowchart showing request reception processing performed by an information provision subsystem 200.
Figure 9:
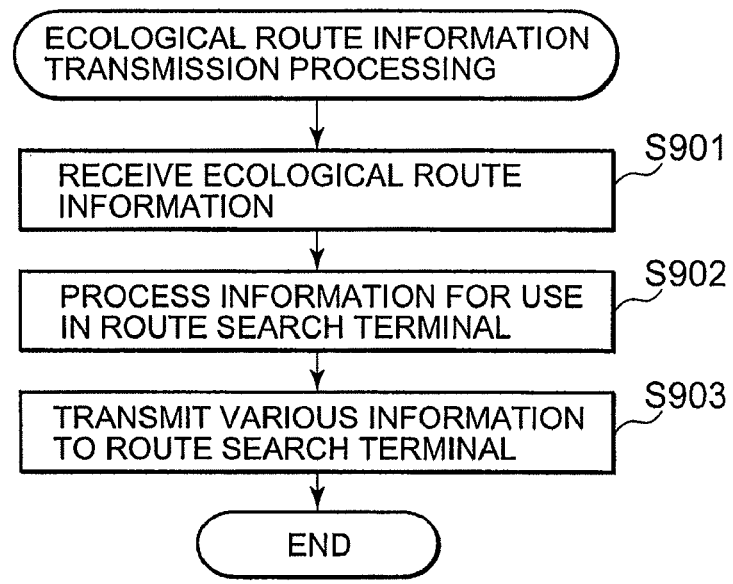
FIG. 9 is a flowchart showing ecological route information transmission processing performed by the information provision subsystem 200.

Referring to FIGS. 8 and 9, a description will be of processing to provide ecological route performe by the information provision subsystem 200. The ecological route providing processing is composed of request reception processing for receiving a ecological route search request (request information) from the route search terminal 30 and transmitting the same to the search subsystem 100, and ecological route information transmission processing for receiving the result of the ecological route search processing obtained by the search subsystem 100 and transmitting the same to the route search terminal 30.

FIG. 8 is a flowchart showing the request reception processing performed by the information provision subsystem 200.

The information provision subsystem 200 determines whether or not request information is received from the route search terminal 30, and proceeds to the next step (step S801). The request information transmitted by the route search terminal 30 contains position information on departure point, position information on destination point, departure time information, and so on. The request information may further contain information on a vehicle on which the route search terminal 30 is installed (e.g., type of vehicle, engine displacement, and discharge amount of greenhouse gas).

The information provision subsystem 200 analyzes the received request information to acquire the position information on departure point, the position information on destination point, the departure time information, and so on (step S802).

The information provision subsystem 200 adds error check information and supplementary information to the acquired information and converts the same into request information of a format readable by the search subsystem 100 (step S803).

The information provision subsystem 200 transmits the converted request information to the search subsystem 100 (step S804).

FIG. 9 is a flowchart showing ecological route information transmission processing performe by the information provision subsystem 200.

The information provision subsystem 200 receives the ecological route information obtained as a result of the ecological route search processing (e.g., the self minimum $CO_2$ route information, the first ecological route information, and the second ecological route information) (step S901). The ecological route information is composed of positional (topological) information on a route from a departure point to a destination point, and numerical information such as a travel time value, a $CO_2$ discharge amount, a first ecological cost value, a second ecological cost value, and a travel distance value.

The information provision subsystem 200 performs arithmetic processing on the ecological route information to generate ecological route map information and ecological route numerical information (step S902).

The ecological route map information is image information generated to be suitable for the route search terminal 30 by image processing to draw the route information with points and lines on a map, based on the positional (topological) information on the route in the ecological route information and the map information managed by the route search system 10.

The ecological route numerical information is numerical information generated based on the numerical information in the ecological route information and edited to be suitable for the route search terminal 30.

The information provision subsystem 200 transmits to the route search terminal 30 information relating to environmental loads to be used for route search (ecological route map information and ecological route numerical information), as the ecological route information (step S903).

A description will be made of operation of the route search terminal 30. The operation of the route search terminal 30 can be divided into request processing for requesting the route search system 10 for information on route search when searching for a route, and response processing for receiving a response to the request and presenting the searched rote to the user.

Figure 10:
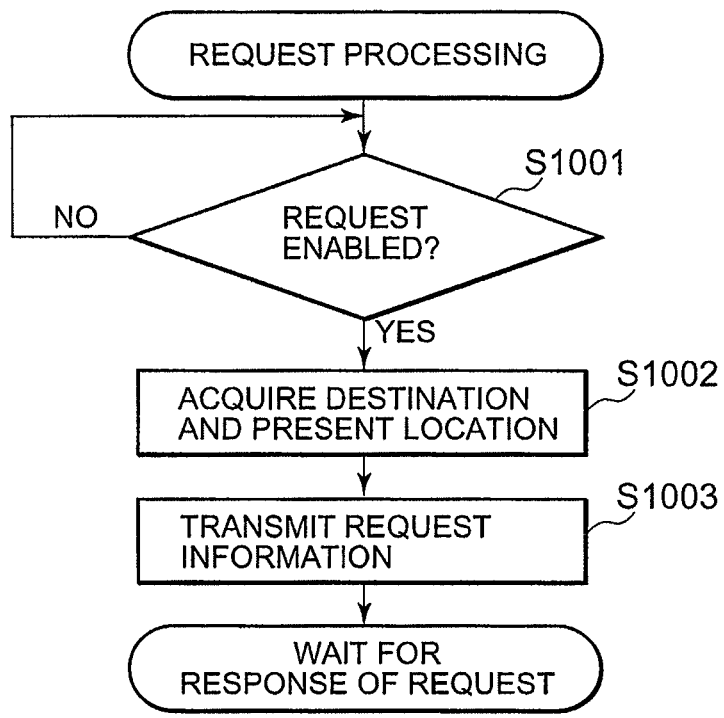
FIG. 10 is a flowchart showing request processing performed by the route search terminal 30.

FIG. 10 is a flowchart showing the request processing performed by the route search terminal 30.

The control unit of the route search terminal 30 performs reception processing of request reception enable information transmitted by the information provision subsystem 200 according to the request transmission program 311, and determines whether a route request is allowable or not (step S1001).

The control unit of the route search terminal 30 acquires destination information and current position information input by the operator according to the request transmission program 311 and screen display program 313 (step S1002).

The control unit of the route search terminal 30 transmits the various information thus acquired to the information provision subsystem 200 as request information according to the request transmission program 311 (step S1003).

Figure 11:
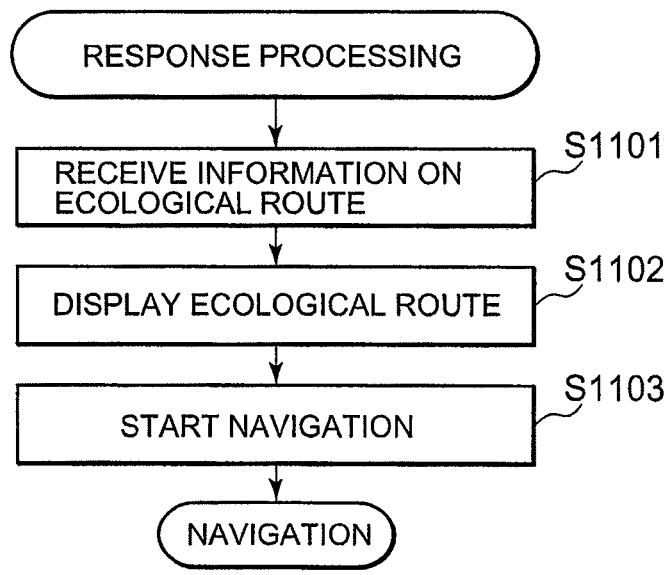
FIG. 11 is a flowchart showing response processing performed by the route search terminal 30.

FIG. 11 is a flowchart showing the response processing performe by the route search terminal 30.

The control unit of the route search terminal 30 receives ecological route information (ecological route map information and ecological route numerical information) containing information relating to environmental loads used for route search, transmitted as a response to the request by the information provision subsystem 200, according to the route information reception program 312 (step S1101).

The control unit of the route search terminal 30 is displayed on a display unit, information of a plurality of routes selected in consideration of the environmental load information, by using the received ecological route map information and ecological route numerical information, according to the screen display program 313 (step S1102).

The control unit of the route search terminal 30 waits for the operator to perform route determination process and, once a route is determined, starts navigation along the determined route in which the environmental loads are low (step S1103).

The map information used by the route search terminal 30 when inputting coordinates of the departure point or destination point may be stored in the route search terminal 30 or may be received from the information provision subsystem 200 every time a route search is performed.

As described above, the route search system 10 according to the present embodiment calculates link costs and calculates a route by using the link costs. This makes it possible to guide the operator along a route in which the increase in environment loads is minimal for the entire ambient environment (road network).

Specifically, for example, a route in which overall loads are minimal can be searched for by calculating, for each road link, the environmental loads generated by the relevant vehicle and other vehicles as a result of addition of the relevant vehicle to the traffic.

Further, the route search system 10 according to the present embodiment calculates the environmental load amount by utilizing traffic information collected in the past for each link in association with time, date and weather conditions, and traffic information collected in real time. This makes it possible to calculate the environmental load amount more precisely by correcting the collected information according to traffic conditions at the time of day when navigation is to be provided, and to accurately search for a route in which the increase in the environmental loads is minimal by quickly responding to any change in traffic conditions on the road network for which the navigation is performed.

Likewise, traffic congestion can be avoided by predicting the same. Thus, it is possible to search for a route in which traffic congestion least likely occurs (environmental loads are low).

Further, since the route search is conducted in consideration of characteristics of automobiles or the like, an optimum route (in which the environmental loads are minimal) can be selected for navigation. It may be believed that the environmental loads would be reduced by the user employing a vehicle which travels at a lower velocity and discharges less greenhouse gas (a vehicle with lower environmental loads). However, even such a vehicle will disturb smooth traffic of other vehicles, causing increase in traffic congestion or greenhouse gas discharged by other vehicles, and resulting in increase in environmental loads as a whole. This problem can be prevented by the use of the route search system of present invention. Further, deterioration of the environment in urban area can be prevented by guiding vehicles with high environmental loads such as large-sized vehicles preferentially to a route passing through the suburbs.

Although the embodiment described above uses the route search system to perform route search, the route search may be performed by a route search terminal. In this case, map information and route search programs (route search means) are stored in an auxiliary memory device provided in the route search terminal. The control unit of the route search terminal acquires from the route search system information relating to environmental loads to be used for generation of route information, and calculates a route involving minimum environmental loads according to the route search programs.

The route search terminal need not necessarily be movable along with the vehicle. For example, the route search terminal may be a personal computer immovably installed at home, or an information processing terminal installed in a street.

Although the route search system according to the embodiment above acquires traffic information from the traffic information system, the route search system itself may be provided with a system for collecting traffic information. Further, the route search system may perform ecological route search processing, using only statistical traffic information.

The algorithm for ecological route search processing is not limited to a typical route search processing method such as a Dijkstra method or label correction method, but it may, for example, be a route search processing method in which environmental loads generated when the vehicle turns right or left (turn cost) or a environmental load rate specified for each area which the vehicle passes through (area cost) is also taken into consideration.

Further, predicted traffic information generated based on statistical data or prediction may be used as the traffic information. In this case, the route search system acquires the predicted traffic information from the traffic information system and calculates link costs (environmental load values) based on the acquired information.

According to the present invention, as described above, comprehensive link costs are calculated by taking into consideration not only a link cost for each link but also the vehicle having the route search terminal installed and other vehicles traveling along the link and the environment, and these comprehensive link costs are used in the route search. This makes it possible to reduce the environmental loads caused to society and to reduce the traffic congestion by timely controlling the traffic volume.

Thus, the present invention provides a route search system which is capable of reducing the environmental loads and traffic congestion caused by addition of a vehicle to be navigated to a traffic stream.

The scale of the route search system can be varied according to number of objects manage by the system. For example, when the route search system is used in association with a large-scaled traffic system, a host server and/or database may be provided and made redundant so that the search system is compatible with existing systems. When the route search is to be conducted for a limited area or specific place, the route search system may be constructed by using a common server without using subsystems. Further, programs are recorded in a memory unit so that the control unit functions as the various means according to the programs. The memory unit used herein may be selected appropriately from a ROM, a RAM, a HDD and so on.

It is to be understood that the invention is not limited to the details of configuration and operation described in relation to the embodiment above, and modifications and variations may be made without departing from the spirit or scope of the invention.

What is claimed is:

1. A route search system for receiving a provision request from a route search terminal installed on a first vehicle, to transmit route search information related to a route including at least one link, comprising:
   an information provision subsystem for acquiring information in response to the provision request from the route search terminal;
   an environmental load calculation unit for calculating, based on the information acquired by the information provision subsystem, a first environmental load generated by the first vehicle which has the route search terminal installed thereon and which runs along each link related to the information acquired by the information provision subsystem, and a second environmental load which is generated by at least one second vehicle running along each link and which is varied to account for the first vehicle traveling along each link,
   wherein,
   the environment load calculation unit sums up the first environmental load and the second environment load at each link over the route to obtain a summed up value and select the route with the smallest summed up value.

2. The route search system as claimed in claim 1, wherein the first environmental load and the second environmental load are calculated by using an amount of discharged greenhouse gas.

3. The route search system as claimed in claim 1, wherein the first environmental load and the second environmental load are calculated by using an amount of traffic congestion.

4. The route search system as claimed in claim 1, wherein the route search terminal is a navigation terminal installed on the first vehicle.

5. The route search system as claimed in claim 1, wherein the provision request received from the route search terminal contains information on at least one of a type of the first vehicle or greenhouse gas discharge by the first vehicle.

6. The route search system as claimed in claim 1, wherein the first environmental load includes carbon dioxide gas ($CO_2$) discharged by the first vehicle.

7. The route search system as claimed in claim 1, wherein the calculation of the environmental load is performed by using information accumulated for each link at different times of day, and adding up the first environmental load generated by the first vehicle with the second environmental load generated by a variation in velocities of the at least one second vehicles running along the same link.

8. The route search system according to claim 1, further comprising a control unit which receives the first environmental load and the second environmental load, wherein the control unit finds a navigation route using the first and second environmental loads.

9. The route search system as claimed in claim 1, wherein, the environment load calculation unit generates information related to the route with the smallest summed up value.

10. The route search system as claimed in claim 9, further comprising:
a transmitting unit which transmits, as the route search information to the route search terminal, the information related to the route with the smallest summed up value.

11. A route search method performed by a route search system to transmit route search information related to a route including at least one link in response to a provision request from a route search terminal installed on a vehicle, comprising:
acquiring information, by using a processor, in response to the provision request from the route search terminal; and
calculating, by using the processor and based on the information acquired by the information provision subsystem, a first environmental load generated by the first vehicle which has the route search terminal installed thereon and which runs along each link related to the information acquired by the information provision subsystem, and a second environmental load which is generated by the at least one second vehicle running along each link and which is varied to account for the first vehicle traveling along each link; and
summing, by using the processor, the first environment load and the second environment load at each link over the route to obtain a summed up value used to select a route with the smallest summed value.

12. The route search method as claimed in claim 11, comprising:
searching for a route based on the first environmental load and the second environmental load, in response to the information provision request from the route search terminal; and
transmitting route information found by the search to the route search terminal as the route search information.

13. The route search method as claimed in claim 11, wherein the first environmental load and the second environment load are calculated using an amount of discharged greenhouse gas.

14. The route search method as claimed in claim 13, wherein the greenhouse gas is carbon dioxide.

15. The route search method as claimed in claim 11, wherein the first environmental load and the second environmental load are calculated using an amount of traffic congestion.

16. The route search method as claimed in claim 11, wherein the route search terminal is a navigation terminal installed on the first vehicle.

17. The route search method as claimed in claim 11, wherein the calculation of the environmental load generated by the first vehicle designated by the route search terminal is conducted by using information accumulated for each link at different times of day, and adding up each of the first environmental loads generated by the first vehicle running along the link and the second environmental load generated by a variation in velocities of the at least one second vehicle running along the same link.

* * * * *